United States Patent
Purves

(10) Patent No.: US 10,536,424 B2
(45) Date of Patent: Jan. 14, 2020

(54) CHECKOUT CHASSIS CHAT PLATFORM

(71) Applicant: Thomas Purves, San Francisco, CA (US)

(72) Inventor: Thomas Purves, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 190 days.

(21) Appl. No.: 15/700,071

(22) Filed: Sep. 8, 2017

(65) Prior Publication Data
US 2018/0069825 A1  Mar. 8, 2018

Related U.S. Application Data

(60) Provisional application No. 62/385,241, filed on Sep. 8, 2016.

(51) Int. Cl.
*H04L 12/58* (2006.01)
*H04L 29/06* (2006.01)
*G06Q 20/36* (2012.01)

(52) U.S. Cl.
CPC ............ *H04L 51/36* (2013.01); *G06Q 20/36* (2013.01); *H04L 51/046* (2013.01); *H04L 67/42* (2013.01)

(58) Field of Classification Search
CPC ....... H04L 51/36; H04L 51/046; H04L 67/04; H04L 67/125; H04L 67/20; H04L 67/42; H04L 67/02; G06Q 20/36

USPC .......................................................... 709/206
See application file for complete search history.

(56) References Cited

U.S. PATENT DOCUMENTS

| | | | |
|---|---|---|---|
| 2007/0157203 A1* | 7/2007 | Lim | G06F 9/468 718/100 |
| 2011/0010543 A1* | 1/2011 | Schmidt | H04W 12/10 713/168 |
| 2011/0276396 A1* | 11/2011 | Rathod | G06Q 10/00 705/14.49 |
| 2014/0172999 A1* | 6/2014 | Morris | H04L 67/32 709/206 |

* cited by examiner

*Primary Examiner* — Kristie D Shingles
(74) *Attorney, Agent, or Firm* — Loeb & Loeb LLP

(57) ABSTRACT

A computerized method for integrating message-based services with external execution environments includes receiving from a first external execution environment a request to access message-based services of a messaging software. A processor determines whether the first external execution environment includes a pre-existing relationship with the messaging software. If no, the processor requests access to a second external execution environment on behalf of the first external execution environment. The processor receives a response from the second external execution environment granting the access; and the processor grants the request from the first external execution environment to access the message-based services in the messaging service while integrating services from the second external execution environment to the messaging software. If yes, the processor identifies parameters associated with the pre-existing relationship and grants the request from the first external execution environment.

17 Claims, 9 Drawing Sheets

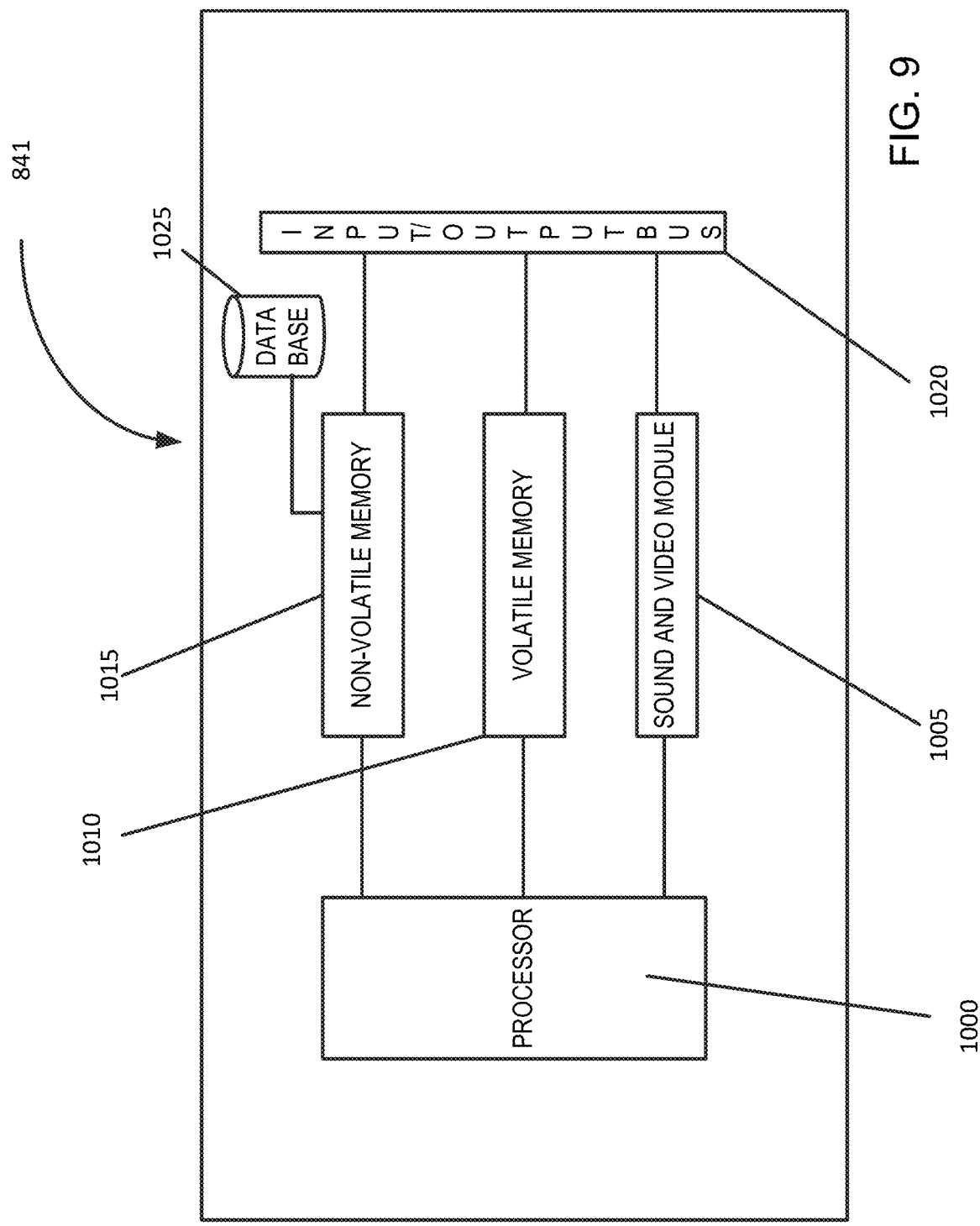

CHECKOUT CHASSIS CHAT PLATFORM

CROSS-REFERENCE TO RELATED APPLICATION

This is a nonprovisional patent application of the provisional patent application, Ser. No. 62/385,241, filed on Sep. 8, 2016, whose disclosure is incorporated by reference in its entirety herein.

FIELD OF INVENTION

This invention generally relates to artificial intelligent software applications instantiated in a messaging software that handle cross-platform processing of commands.

BACKGROUND

The Internet is one of the most significant innovations in bringing people together, despite the physical distances between them. It paves the way for more interactions between people. For example, electronic mail, one of the most frequently used communication means in the Information Age, could not be so prevalent without the Internet.

As communication devices become mobile, so are communication means. While voice communications via telephone numbers are still the norm, short messaging or text messages are becoming the default communication method. Moreover, these text messages have evolved to be capable of handling more than just alphanumerical contents. For example, messaging software is capable of allowing text messages in the form of "chat messages" or "instant messages" to include hyperlinks, voice messages, graphics, images, videos, and animations such that they capture the full range of expressions and emotions that the participants wish to convey.

As such, there is a desire to build an all-inclusive or an all-capable messaging software to handle all aspects of a user's activities. While this may be desirable, this in-app architecture requires the app/software itself includes all necessary software infrastructure, data structure, data schemas, protocol layers, encryption layer, encryption keys, etc., to be fully comprehensive. This would inevitably increase the complexity of the software and significantly increases the risk of bugs, security holes, virus attacks, as well as privacy loopholes, etc. Moreover, despite the increased capabilities of mobile devices, the messaging software with such design still suffers issues of limited resources, such as limitation on power supply, data storage, or processing power.

It is desirable therefore to further expand the scope of the activities to enable chat participants to perform many additional tasks other than chats or conversing via the messaging software without adding burdens to the messaging software/app. It is also desirable to enable seamless transfer of information or data across software boundaries from the messaging software/app.

SUMMARY

Embodiments of the invention create flexibilities that elevate the capabilities of a messaging software/app. In addition, embodiments of the invention provide a base layer of information infrastructure for a messaging software, such as a chat app/software, to communicate with another app/software or to a server hosted by another party. In a further embodiment, aspects of the invention provide a seamless integration of external execution environments to the messaging software such that the messaging software may provide is message-based or message-centric services to the external execution environment.

BRIEF DESCRIPTION OF THE DRAWINGS

The invention may be better understood by references to the detailed description when considered in connection with the accompanying drawings. The components in the figures may not necessarily be to scale, emphasis instead being placed upon illustrating the principles of the invention. In the figures, like reference numerals designate corresponding parts throughout the different views.

FIG. 9 is an illustration of a server computing device.

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 1:
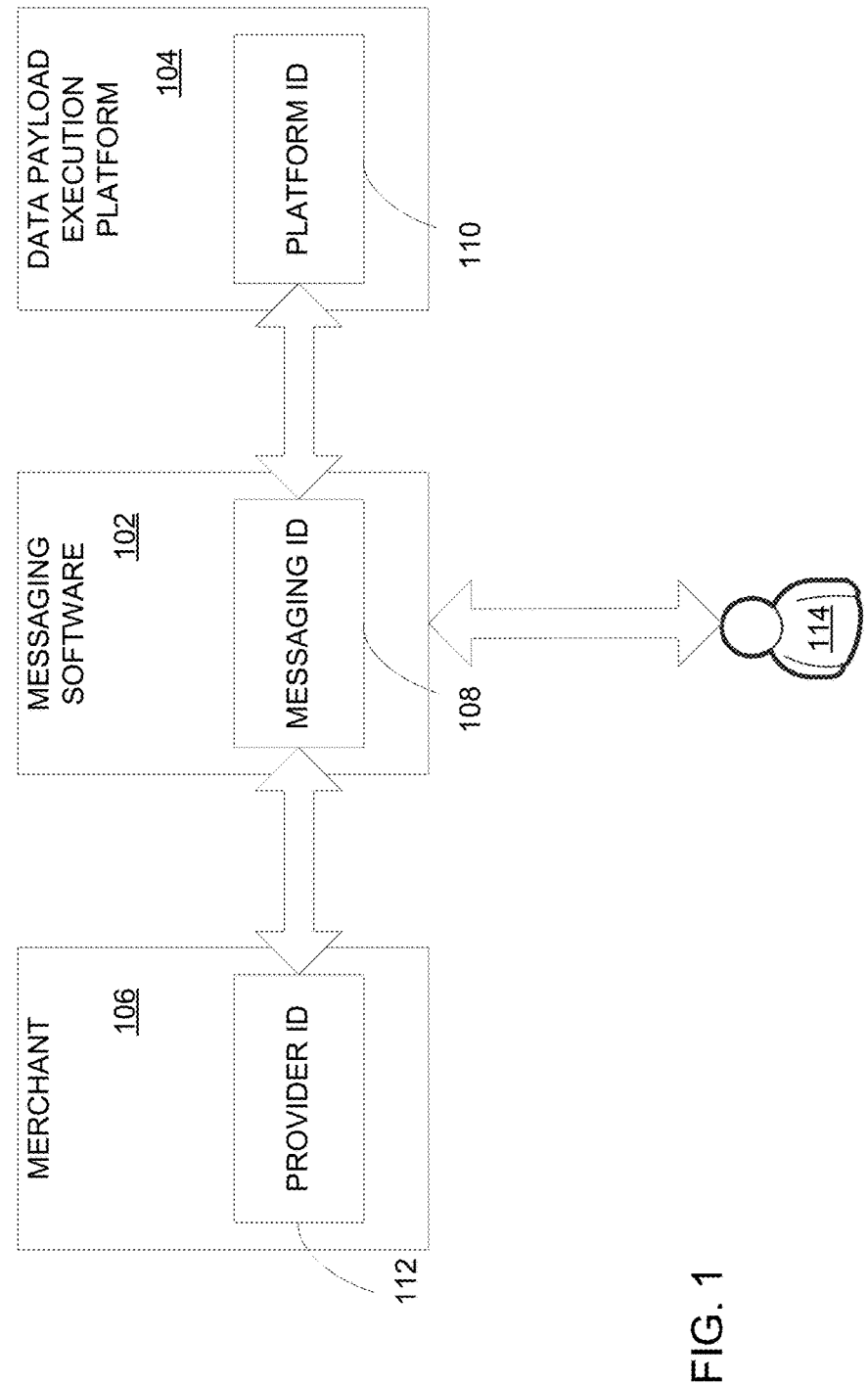
FIG. 1 illustrates a diagram of a system of a computer chassis framework centered around a messaging software/app according to one embodiment of the invention.

Referring now to FIG. 1, a diagram illustrates a system of a seamless transition between a smaller display device and a larger display device during purchase interactions according to one embodiment of the invention. The system 100 includes a number of participants, such as a messaging software 102, a data payload execution platform 104, a merchant 106 and a user 114. In one example, the data payload execution platform 104 and the merchant 106 may be considered as external execution environment with respect to the messaging software 102. In another embodiment, the messaging software 102, the data payload execution platform 104, and the merchant 106 include a number of hardware components associated therewith. For example, the messaging software 102 may be stored in a memory of a mobile computing device (see also FIGS. 7 and 8) and the mobile computing device includes processor(s) for executing the messaging software 102. The messaging software 102 may be made available to the user 114 via a user interface (graphical or audio) such that the user 114 may interact with the messaging software 102. Moreover, the messaging software 102 may issue computer-executable links, commands, instructions, etc., to other software, apps, hardware, or the like via an application programming interface (API). In another embodiment, the messaging software 102 may issue computer-executable links embedding instructions or commands for the user 114 to select the computer-executable links via the user interface.

Similarly, the data payload execution platform 104 may include server(s) (see also FIG. 9), database, or the like. The data payload execution platform 104 may be interfaced with the user 114 via an app or software installed or instantiated on the mobile device as the messaging software 102. In a further example, the data payload execution platform 104 may be a payment processing system, a payment network, or the like. The interfaced app or software of the data payload execution platform 104 may be a checkout app, a wallet app, or the like. The data payload execution platform 104 may further communicate with other systems, such as server(s) run or operated by banking institutions, etc. In one embodiment, the data payload execution platform 104 may generate computer-executable links, commands or instructions for consumption by the messaging software 102 and/or the merchant 106.

Also, the merchant 106 may be a content provider (e.g., news feeds, web content) or a provider of goods or services that may conduct business with the user 114. The merchant 106 may include its computer systems that handle inventory management, warehouse management, order processing, or the like. The merchant 106 may further include a web portal displaying one or more goods or services for purchase or transaction with the user 114 and the user 114 may be able to visit the web portal from the messaging software 102. In another embodiment, the merchant 106 may generate or create computer-executable links for user 114 to interact or select. In a further embodiment, the merchant 106 may generate computer-executable links, commands or instructions for consumption by the messaging software 102 and/or the data payload execution platform 104.

In one embodiment, the messaging software 102 may include a messaging ID 108 associated with the messaging software 102. In one example, the messaging ID 108 may include information of the user 114 (based on what is available on the messaging software 102), version information of the messaging software 102, hardware identification of the mobile device on which the messaging software 102 is executed, or the like. Similarly, the data payload execution platform 104 may include a platform ID 110 that may identify the user 114 with the data payload execution platform 104, version information of the data payload execution platform 104, hardware identification of the mobile device on which the data payload execution platform 104 is executed, or the like. Likewise, the merchant 106 may include a provider ID 112 that may include a merchant name, a merchant's contact information (e.g., telephone, website address, address), a merchant's social media links, etc.

Figure 2:
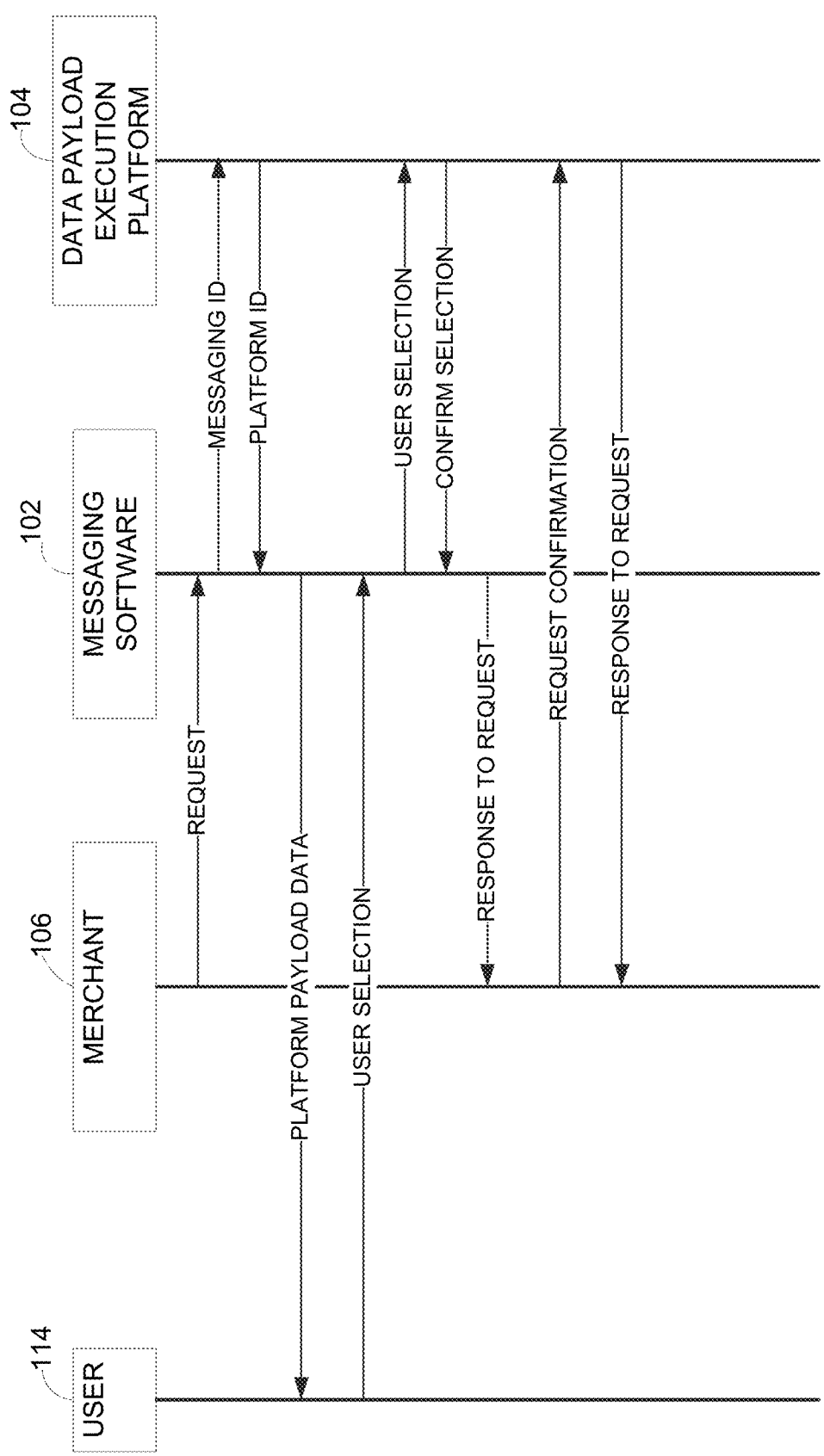
FIG. 2 illustrates a diagram depicting flows of information to and from a messaging software/app according to one embodiment of the invention.

Referring now to FIG. 2, a diagram depicts flows of information to and from a messaging software/app according to one embodiment of the invention. In one embodiment, a connection between the platform ID 110 and the messaging ID 108 may be optionally established. In one example, the connection may be established when the user 114 first operates the messaging software 102 and/or the data payload execution platform 104. In another embodiment, the connection may be established in response to an invitation sent by the messaging software 102 once the messaging software 102 has identified the presence of the data payload execution platform 104. For example, the messaging software 102 may review a list of installed app/software of the mobile device periodically. In one embodiment, the user 114 may initiate the connection between the data payload execution platform 104 and the messaging software 102. In one example, the user 114 may be using the data payload execution platform 104 and wishes to connect the two. The user 114 may click on a computer-executable link provided in the data payload execution platform 104 to make the connection. In another embodiment, the user 114 may click or select a computer-executable link provided by contents provided within the data payload execution platform 104. For example, suppose the data payload execution platform 104 is a payment processing platform and may include a checkout or wallet app associated therewith. The user 114 may, through the checkout/wallet app, add or associate his or her bank accounts, credit card accounts, or the like in the data payload execution platform 104. When accessing contents in the checkout/wallet app, the user 114 may review and select computer-executable links therein and one of such computer-executable links may request the permission of the user 114 to connect the messaging software 102 with the data payload execution platform 104.

Of course, such connection between the data payload execution platform 104 and the messaging software 102 make a variety of message-based features from the data payload execution platform 104, such as chat-based account alerts and notifications, to the user 114 via the messaging software 102. At the same time, in another example, the connection may enable message-based customer support, message-based card linked offers and conversational commerce to the user 114 via the messaging software 102. As such, the data payload execution platform 104 may fully leverage the existing capabilities of the messaging software 102 and the messaging software 102 may adaptively and also seamlessly provide the user 114 using information from the data payload execution platform 104.

In an alternative embodiment, the connection between the data payload execution platform 104 and the messaging software 102 may be established after an internal connection has been made in the data payload execution platform 104. For example, the user 114 may first make sub-account connections within the data payload execution platform 104. For example, the user 114 may have a number of financial accounts, loyalty accounts, or the like managed by the data payload execution platform 104. As such, the data payload execution platform 104 may become the central depository for the user 114 of these accounts. In such an embodiment, the user 114 may further give permission or authorization to the data payload execution platform 104 to link with the messaging software 102. This authorization or permission may give the data payload execution platform 104 access to chat based services and commerce across all of their bank relationships that the user 114 has previously connected. With this embodiment, the data payload execution platform 104 may further manage all of the message software 102's integration and identity linking and management on behalf of the sub-accounts. This link further efficiently and significantly reduces the cost/effort to the sub-accounts to take advantages of the capabilities and functions of the messaging software 102.

In addition to the approaches that the data payload execution platform 104 and the messaging software 102, there may be other methods to connect the data payload execution platform 104 and the messaging software 102. One of such methods involve the merchant 106. In such an example, the merchant process 106 may, through the web portal of the merchant 106 or an artificial intelligent or bot of the merchant 106, request credentials (such as sending a signal) from the messaging software 102. In one example, the merchant 106 may submit such request via an API published by the messaging software 102. In response from such request from the merchant 106, the messaging software 102 issues instructions or calls (such as sending a signal) to the data payload execution platform 102. The instructions or calls, may include information for a number of objects that are responsive to the request from the merchant 106. For example, if the merchant 106's request includes a request to conduct a business with the user 114 through the messaging software 102, the call or instruction to the data payload execution platform 102 from the messaging software 102 may then include a listing of cards/accounts that may be capable to conduct such business along with addresses associated therefore. In another embodiment, in order to protect the privacy of the user 114, the messaging software 102 may only receive a representation of the cards only, and not the actual payment authorization number (PAN) or payment authorization token.

The data payload execution platform 104 responds to the instructions or call from the messaging software 102 and the messaging software 102 subsequently sends the response (such as sending a signal) to the user 114 such that the user 114 may directly respond in the messaging software 102. For example, the user 114 may select card/address within the messaging software 102. In another embodiment, the user 114 may further select any additional information that may be sent along from the data payload execution platform 104 to the messaging software 102. For example, the user 114 may additionally select objects, such as loyalty program cards, accounts, or other information to be passed to the merchant 106.

In an alternative embodiment, the user 114 may setup additional security measures within the messaging software 102 such as authentication via biometric (via the mobile device), one-time-password, etc., such that future processing may be more convenient.

Once the user selects the desirable choice, in one embodiment, the selection is transmitted back to the data payload execution platform 104 for one more confirmation. The data payload execution platform 104 may next transmit a signal to the messaging software 102 with the confirmation. This signal may then trigger the messaging software 102 to send the confirmation to the merchant 106. Using this confirmation, the merchant 106 may further compose a processing confirmation that includes the earlier confirmation from the data payload execution platform 104 and other data packets that are relevant and pertinent to the business. This processing confirmation is next transmitted to the data payload execution platform 102 and the data payload execution platform 104 may process the processing confirmation and respond thereto to the merchant 106.

Figure 3:
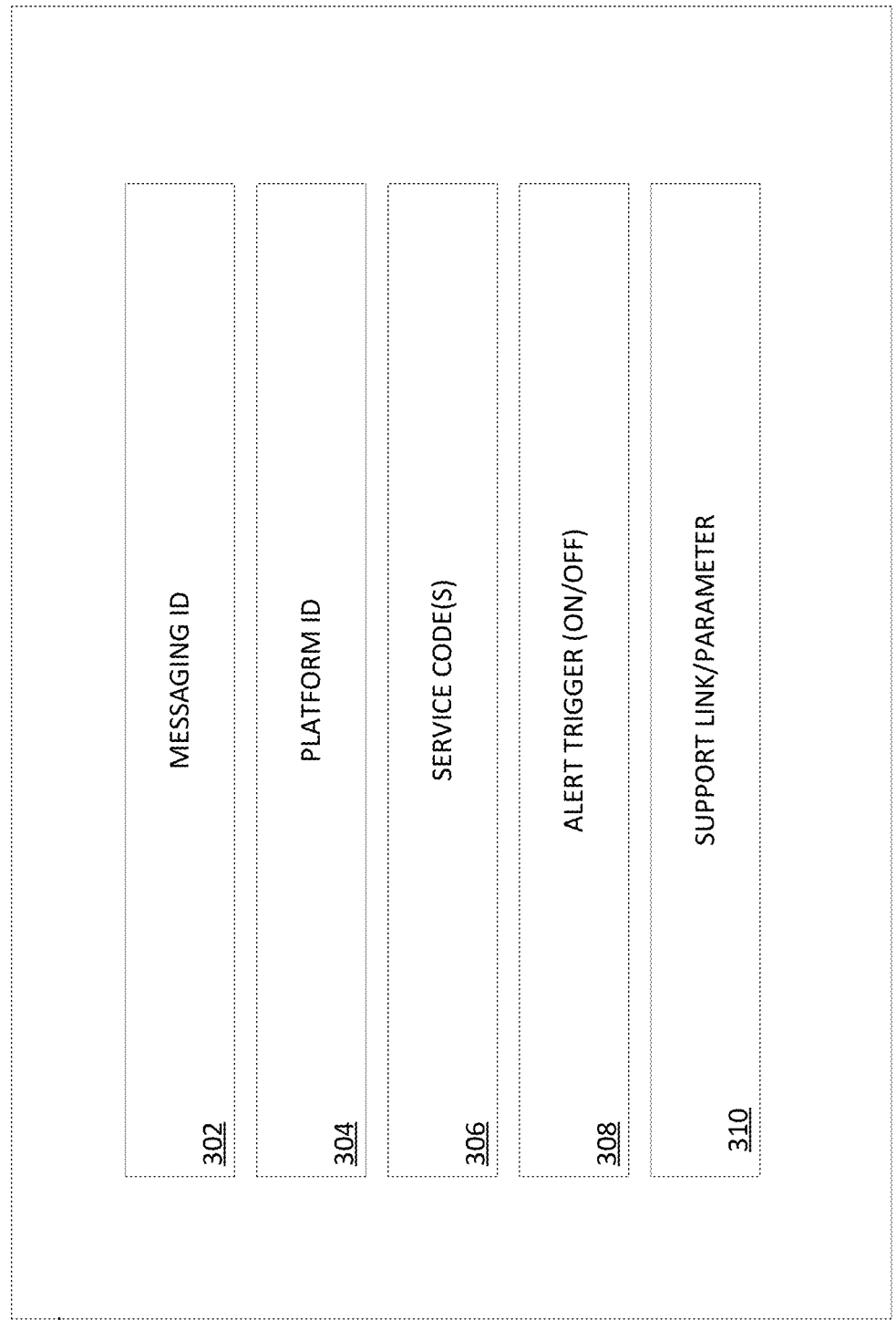
FIG. 3 illustrates a diagram of exemplary data structure of a data packet transmitted supplied by a messaging software/app according to one embodiment of the invention.

Referring now to FIG. 3, a diagram illustrates an exemplary data structure of a data packet transmitted supplied by a messaging software/app according to one embodiment of the invention. The data structure 300 may include at least one of the following data fields for storing data that may be used by and consumed by the messaging software 102. For example, the data structure 300 includes a data field for storing a messaging ID 302, a platform ID 304, service code(s) 306, alert trigger (on/off) 308, and a support link/parameter 310. In one embodiment, the service code(s) 306 may include a list of codes of services provided by the messaging software 102. In another embodiment, the support link/parameter 310 may include data, computer-executable link that the messaging software 102 may include in its data packets.

Figure 4:
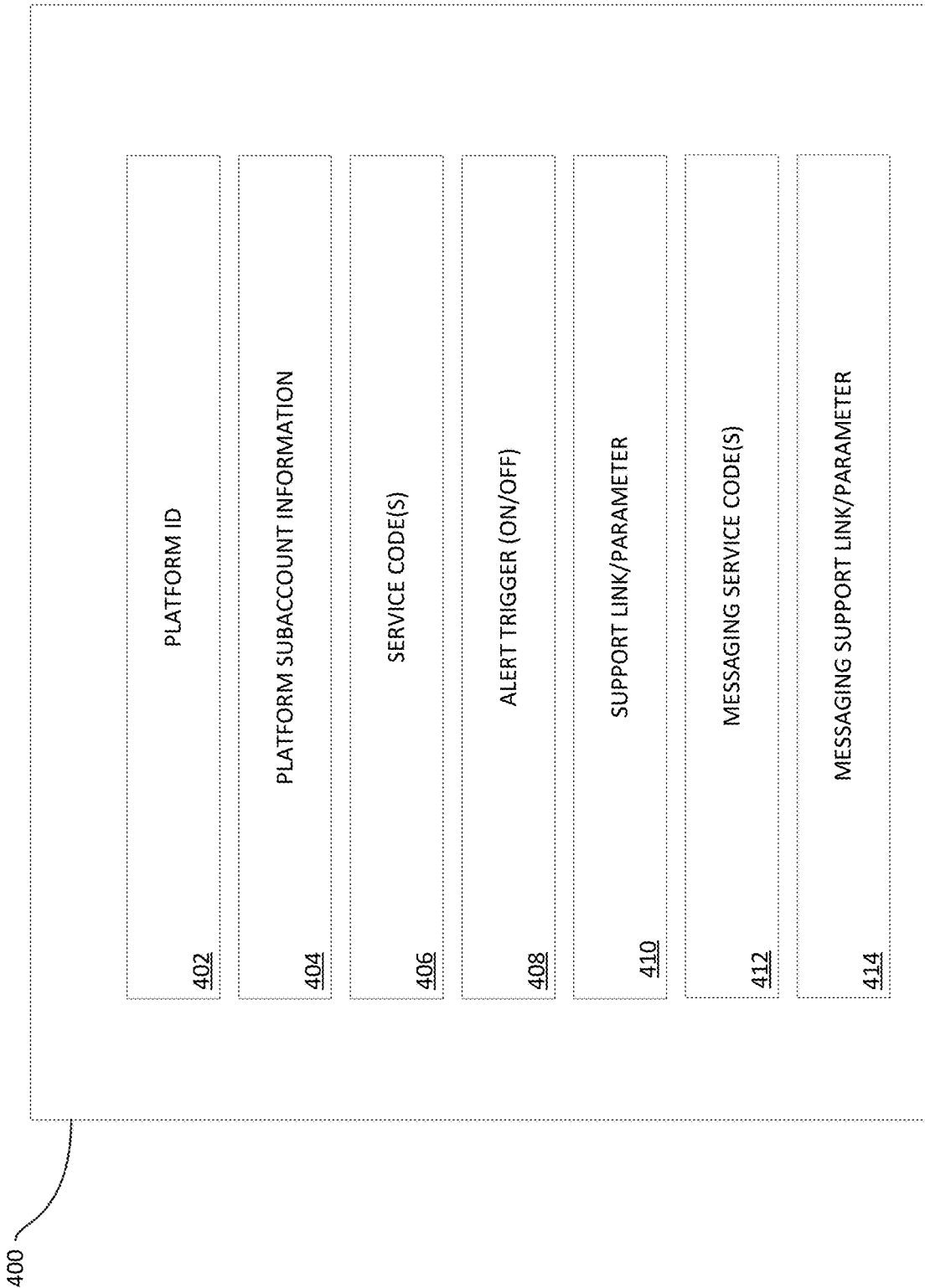
FIG. 4 illustrate a diagram of exemplary data structure of a data packet to be consumed by a data payload execution platform according to embodiments of the invention.

Referring now to FIG. 4, a diagram illustrates an exemplary data structure 400 of a data packet to be consumed by a data payload execution platform according to embodiments of the invention. In one example, the data structure 400 may include one or more of the following data fields: a platform ID 402, a platform sub-account information 404, service code(s) 406, alert trigger (on/off) 408, support link/parameter 410, messaging service code(s) 412, and messaging support link/parameter 414. In one embodiment, the support link/parameter 410 may include link, computer-executable link to an artificial intelligence ("AI") of the data payload execution platform 104 that may be instantiated in the messaging software 102 to provide support to the user 114. Similarly, the messaging support link/parameter 414 may provide a similar AI associated with the messaging software 102 to identify message-based or chat-based services within the data payload execution platform 102.

Figure 5:
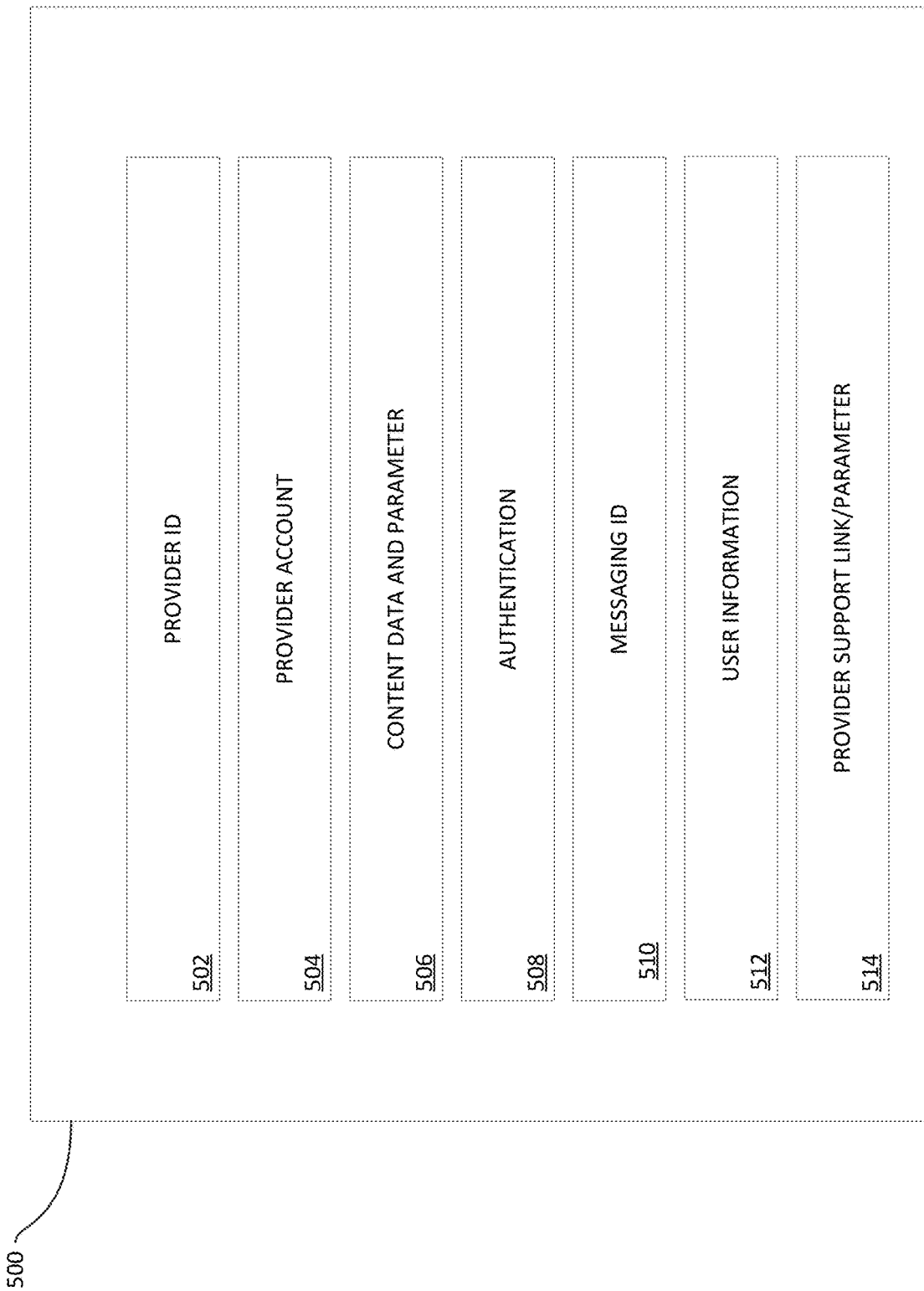
FIG. 5 illustrates a diagram of exemplary data structure of a data packet submitted by a provider according to one embodiment of the invention.

Referring now to FIG. 5, a diagram illustrates an exemplary data structure 500 of a data packet submitted by a provider according to one embodiment of the invention. In one embodiment, the merchant 106 may be a provider. In one embodiment, the data structure 500 may include one or more data fields include at least the following: a provider ID 502, provider account 504, content data and parameter 506, authentication 508, messaging ID 510, user information, 512 and provider support link/parameter 514. In one example, the content data and parameter 506 includes information or data associated with the goods or services provided by the merchant 106. For example, suppose the merchant 106 conducts transactions with the user 114. As such, the content data and parameter 506 may include information or data such as a description of the goods, the price of the goods, the quantity of the goods, etc. In one embodiment, the provider support link/parameter 514 may provide an AI associated with the merchant 106 to identify message-based or chat-based services within the merchant 106.

In another embodiment, the merchant 106 may further include other fields or information than those in the data structure 500. For example, the merchant 106 may previously enroll with the data payload execution platform 104. In this case, the merchant 106 may include a computer-executable link to a profile established with the data payload execution platform 104 as part of the authentication field 508. With such example, the messaging software 102 may in turn, upon receive the data packet from the merchant 106, include such profile link when communicating with the data payload execution platform 104.

In another embodiment, the merchant 106 may establish a separate profile directly with the messaging software 102. For example, such profile may include information such as the name of the merchant 106, as well as possible information, while meeting the security or privacy criteria established by the merchant 106, from the messaging software 102 may be accepted. For example, the merchant 106 may include in the profile which credit card, types of credit cards (e.g., cards issued from one country v. another) and currencies the merchant 106 may accept; location where the merchant 106 may ship any products or items to and other common configuration settings.

With such profile between the merchant 106 and the messaging software 102, the messaging software 102 may enroll the merchant 106 automatically to the data payload execution platform 104 because of the previously established relationship. In a further embodiment, the data payload execution platform 104 may even further enable or add decryption keys back to the merchant 106 so the merchant 106 may decrypt payloads from the data payload execution platform 104.

In another embodiment, a third party, such as another solution provider platform, may have already registered or linked with the merchant 106, as well as other members of the third party, on behalf of the merchant 106. Suppose this third party then establish a connection with the messaging software 102. With this connection, the third party wishes to enable the capabilities of the messaging software 102 to all of its members, and in turn, gain access to the data payload execution platform 104. In such an embodiment, the merchant 106 may then include information of the third party, as well as the messaging ID of the third party with the messaging software 102 in the data structure 500. From this approach, members of the third party would not miss out the opportunity to be connected with the messaging software 102 and the data payload execution platform 104.

Figure 6:
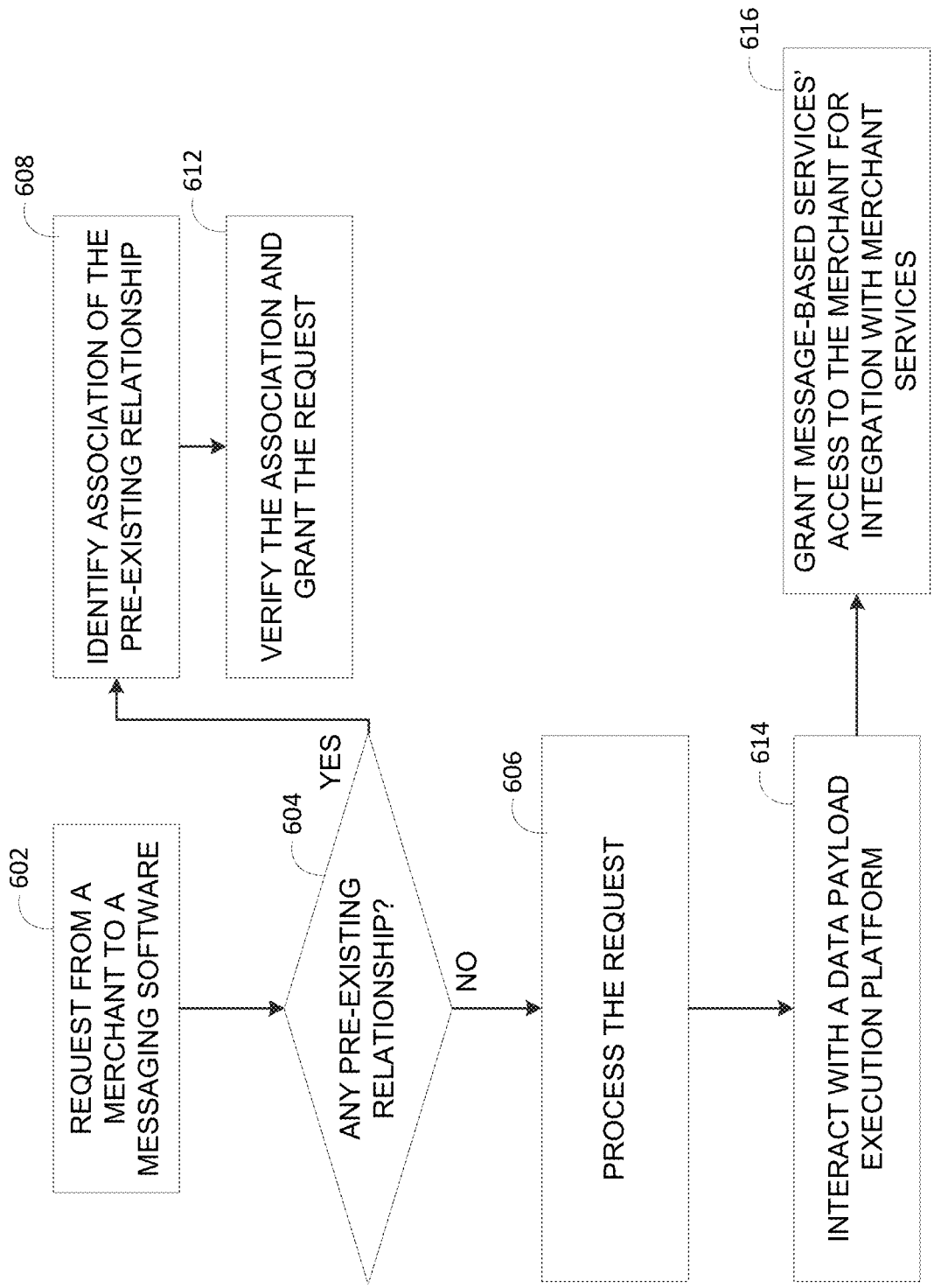
FIG. 6 illustrates a flowchart of processing a messaging-centric processing according to one embodiment of the invention.

FIG. 6 illustrates a flowchart of handling a messaging-centric processing according to one embodiment of the invention. At 602, receiving a request at a messaging software from a merchant. The request includes a request to access to message-based services provided by the messaging software. The request may further include information such as those in data structure 500. In another embodiment, the merchant may wish to gain access to the message-based services provided by the messaging software such that those services may be better integrated into services of the merchant. At 604, the messaging software determines if the merchant has a preexisting relationship therewith. If the determining is negative, at 606, the messaging software processes the request. If the determination is positive, the messaging software reviews the request to identify association of the pre-existing relationship. For example, as previously discussed, the merchant may already have a relationship with a third party or the data payload execution platform. Once identified, the messaging software may verify the association and identify any parameters associated with the relationship. The messaging software may grant the request at 612 and execute messaging-centric or messaging-based services therein.

Returning to 606, the messaging software may next interact with the data payload execution platform to enable access to the data payload execution platform by the merchant at 614. At 616, the messaging software may grant message-based services' access to the merchant for integration with merchant services.

Figure 7:
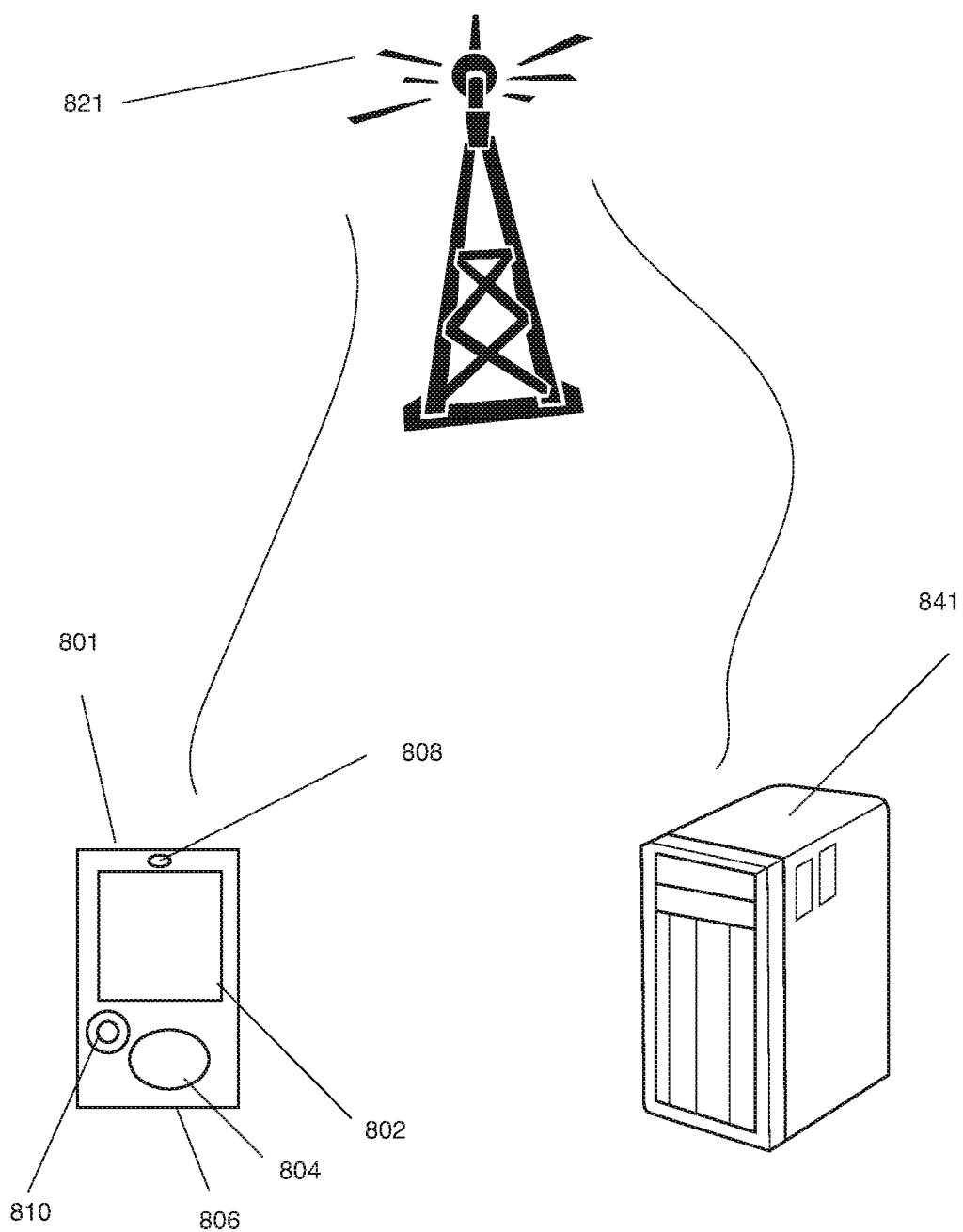
FIG. 7 is an illustration of a messaging-centric system configuration according to one embodiment of the invention.

FIG. 7 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

Figure 8:
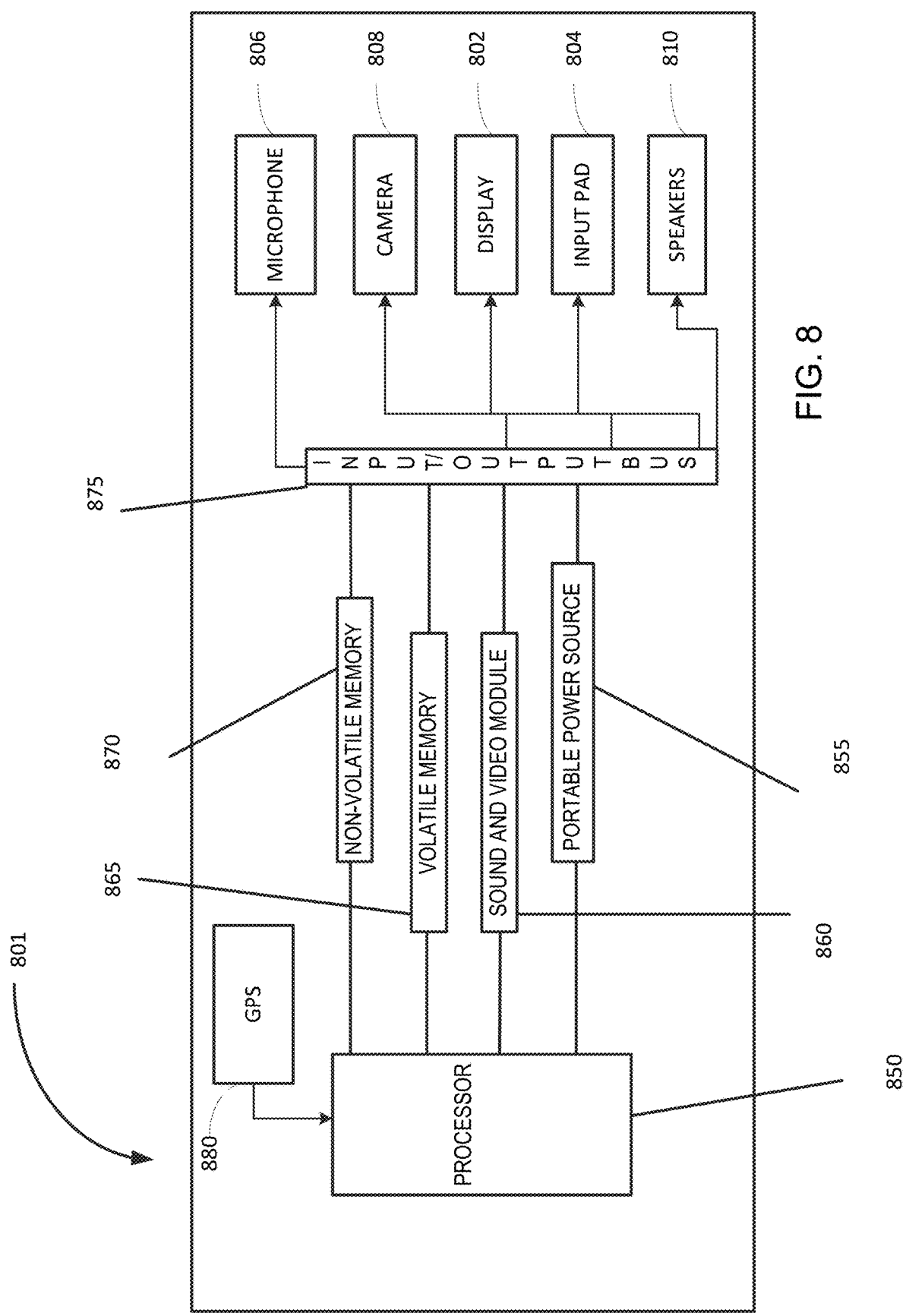
FIG. 8 is an illustration of a portable computing device.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 8 may be a simplified illustration of the physical elements that make up a portable computing device 801 and FIG. 9 may be a simplified illustration of the physical elements that make up a server type computing device 841.

FIG. 8 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 9. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The claimed system and method may address several technical problems and challenges, some of which are described. Currently, entering potential sensitive data across networks makes users nervous to the point that a sale may be lost or money or time saving tips or coupons may not be received. By using a proprietary network such as a payment network, to transfer potentially sensitive data, security may be higher and users may be more open to joining additional beneficial programs. Similarly, moving data from one payment system to another loyalty system has felt risky to some users, but by using a proprietary, trusted network, the data may be communicated in a more trustworthy fashion. In addition, formatting data and communicating data in a manner which may be understood by a variety of additional programs is a technical challenge or problem which the system and method has addressed.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving data payload execution systems. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computerized method for integrating message-based services with external execution environments comprising:
   receiving, by a processor, from a first external execution environment a request to access message-based services of a messaging software on a mobile device to enable a user to interact with the first external execution environment via the messaging software with services from a second external execution environment, said request including a least one computer-executable link, wherein the messaging software is configured to interact with the user on a mobile device, wherein the first external execution environment is configured to display objects on a graphical user interface (GUI) on a first display device that is larger than a second display device of the mobile device;
   determining, by the processor, whether the first external execution environment includes a pre-existing relationship with the messaging software based on a messaging identification (ID) of the messaging software, the messaging ID comprises at least the following information: user information with the messaging software, a version information of the messaging software, a hardware ID of the mobile device;
   in response to the determination being negative:
      processing, by the processor, the request;
      requesting, by the processor from the messaging software, access as a function of a platform ID to the second external execution environment on behalf of the first external execution environment, the platform ID comprises at least the following information associated with the second external execution environment: user information, version information, hardware information, said first external execution environment being different from the second external execution environment, said second external execution environment providing the services to the messaging software;
      receiving, by the processor a response including the platform ID from the second external execution environment granting the access; and
      granting, by the processor, the request from the first external execution environment to access the message-based services in the messaging service on the mobile device while integrating the services from the second external execution environment to the messaging software; or
   in response to the determination being positive:
      identifying, by the processor, the pre-existing relationship based one or more of the following: a provider ID, the platform ID, and the messaging ID;
      identifying, by the processor, parameters associated with the pre-existing relationship; and
      granting, by the processor in the messaging software, the request, said granting comprising instantiating the message-based services in the messaging software according to the identified parameters.

2. The computerized method of claim 1, wherein the pre-existing relationship comprises a business or contractual relationship, and wherein the parameters comprises data defined by the business or contractual relationship.

3. The computerized method of claim 1, wherein the first external execution environment comprises a content provider.

4. The computerized method of claim 1, wherein the second external execution environment comprises a data payload execution platform.

5. The computerized method of claim 1, wherein the messaging software is further configured to interact with a mobile app on the mobile device, said mobile app being an interfacing app for the second external execution environment.

6. A computerized system for integrating message-based services with external execution environments comprising:
   a processor for executing computer-executable instructions;
   a memory for storing computer-executable instructions, said processor and the memory being interconnected;
   wherein the processor is configured to receive from a first external execution environment a request to access message-based services of a messaging software on a mobile device to enable a user to interact with the first external execution environment via the messaging software with services from a second external execution environment, said request including a least one computer-executable link, wherein the messaging software is configured to interact with the user on a mobile device;

wherein the processor is configured to determine whether the first external execution environment includes a pre-existing relationship with the messaging software based on a messaging identification (ID) of the messaging software, the messaging ID comprises at least the following information: user information with the messaging software, a version information of the messaging software, a hardware ID of the mobile device;

in response to the determination being negative:
wherein the processor is configured to process the request;
wherein the processor is configured to request from the messaging software access as a function of a platform ID to the second external execution environment on behalf of the first external execution environment, the platform ID comprises at least the following information associated with the second external execution environment: user information, version information, hardware information, said first external execution environment being different from the second external execution environment, said second external execution environment providing the services to the messaging software;
wherein the processor is configured to receive a response including the platform ID from the second external execution environment granting the access; and
wherein the processor is configured to grant the request from the first external execution environment to access the message-based services in the messaging service while integrating the services from the second external execution environment to the messaging software; or in response to the determination being positive:
wherein the processor identifies the pre-existing relationship based one or more of the following: a provider ID, the platform ID, and the messaging IDf;
wherein the processor identifies parameters associated with the pre-existing relationship; and
wherein the processor grants the request in the messaging software, wherein the processor instantiates the message-based services in the messaging software according to the identified parameters.

7. The computerized system of claim 6, wherein the processor connects the messaging software to the second external execution environment in response a selection of a computer-executable link provided in the second external execution environment.

8. The computerized system of claim 6, wherein the processor connects the messaging software to the second external execution environment through another mobile app installed on the mobile device.

9. The computerized system of claim 6, wherein the first external execution environment is configured to display objects on a graphical user interface (GUI) on a first display device that is larger than a second display device of the mobile device.

10. The computerized system of claim 6, wherein the processor further exchanges a provider ID from the first external execution environment, a messaging ID from the messaging software, and a platform ID from the second external execution environment among the first external execution environment, the messaging software, and the second external execution environment.

11. The computerized system of claim 6, wherein the second external execution environment comprises a payment processing platform.

12. The computerized system of claim 11, wherein the second external execution environment comprises an electronic checkout app installed on the mobile device, and wherein the processor, in response to a user selection by the user, connects the electronic checkout app with the messaging software.

13. A system for integrating message-based services with external execution environments comprising:
a messaging software for providing message-based services;
a first external execution environment for sending a request to access the message-based services of the messaging software on a mobile device to enable a user to interact with the first external execution environment via the messaging software with services from a second external execution environment, said request including a least one computer-executable link, wherein the messaging software is configured to interact with the user on a mobile device;
wherein the messaging software determines whether the first external execution environment includes a pre-existing relationship with the messaging software based on a messaging identification (ID) of the messaging software, the messaging ID comprises at least the following information: user information with the messaging software, a version information of the messaging software, a hardware ID of the mobile device;

in response to the determination being negative:
wherein the messaging software requests access as a function of a platform ID to the second external execution environment on behalf of the first external execution environment, the platform ID comprises at least the following information associated with the second external execution environment: user information, version information, hardware information, said first external execution environment being different from the second external execution environment, said second external execution environment providing the services to the messaging software;
wherein the messaging software receives a response including the platform ID from the second external execution environment granting the access; and
wherein the messaging granting the request from the first external execution environment to access the message-based services in the messaging service on the mobile device while integrating the services from the second external execution environment to the messaging software; or in response to the determination being positive:
wherein the messaging software identifies the pre-existing relationship based one or more of the following: a provider ID, the platform ID, and the messaging ID;
wherein the messaging software identifies parameters associated with the pre-existing relationship; and
wherein the messaging software grants the request, wherein the messaging software instantiates the message-based services in the messaging software according to the identified parameters.

14. The system of claim 13, wherein the parameters associated with the pre-existing relationship between the first external execution environment and the messaging software comprise a provider ID from the first external execution environment and a messaging ID from the messaging software, and a protocol for exchanging the parameters.

15. The system of claim 14, wherein the messaging software further exchanges the provider ID, the messaging ID, and a platform ID from the second external execution environment among the first external execution environment, the messaging software, and the second external execution environment.

16. The system of claim 13, wherein the second external execution environment comprises a payment processing platform.

17. The computerized system of claim 16, wherein the second external execution environment comprises an electronic checkout app installed on the mobile device, and wherein the processor, in response to a user selection by the user, connects the electronic checkout app with the messaging software.

* * * * *